United States Patent
Delbridge

(10) Patent No.: US 6,653,749 B2
(45) Date of Patent: Nov. 25, 2003

(54) PORTABLE POWER SUPPLY SYSTEM AND A METHOD FOR PROVIDING ELECTRICAL POWER

(75) Inventor: Geoffrey Delbridge, Saratoga Springs, NY (US)

(73) Assignee: Plug Power Inc., Latham, NY (US)

( * ) Notice: Subject to any disclaimer, the term of this patent is extended or adjusted under 35 U.S.C. 154(b) by 199 days.

(21) Appl. No.: 09/746,099

(22) Filed: Dec. 22, 2000

(65) Prior Publication Data

US 2002/0080636 A1 Jun. 27, 2002

(51) Int. Cl.[7] .................................................. H02J 1/00
(52) U.S. Cl. .............................. 307/85; 307/64; 307/80
(58) Field of Search ........................... 307/64, 85, 149, 307/80; 429/22, 23

(56) References Cited

U.S. PATENT DOCUMENTS

| | | | | |
|---|---|---|---|---|
| 3,160,528 A | * | 12/1964 | Dengler et al. | 429/22 |
| 3,714,452 A | * | 1/1973 | Williamson | 307/86 |
| 4,412,170 A | * | 10/1983 | Roesel, Jr. | 322/4 |
| 4,724,333 A | * | 2/1988 | Hedin | 307/105 |
| 4,988,580 A | * | 1/1991 | Ohsaki et al. | 204/DIG. 4 |
| 5,023,150 A | * | 6/1991 | Takabayashi | 429/22 |
| 5,053,635 A | * | 10/1991 | West | 307/67 |
| 5,081,367 A | * | 1/1992 | Smith et al. | 307/64 |
| 5,360,679 A | * | 11/1994 | Buswell et al. | 429/19 |
| 5,579,197 A | * | 11/1996 | Mengelt et al. | 361/93.4 |
| 5,646,458 A | * | 7/1997 | Bowyer et al. | 307/67 |
| 5,670,833 A | * | 9/1997 | Mengelt et al. | 307/66 |
| 5,985,474 A | | 11/1999 | Chen et al. | 429/17 |
| 6,080,500 A | * | 6/2000 | Fuju et al. | 429/12 |
| 6,093,500 A | * | 7/2000 | Margiott et al. | 429/13 |
| 6,183,895 B1 | * | 2/2001 | Kudo et al. | 429/20 |
| 6,204,572 B1 | * | 3/2001 | Liran | 307/64 |
| 6,227,890 B1 | * | 5/2001 | Roper et al. | 439/218 |
| 6,304,006 B1 | * | 10/2001 | Jungreis | 307/64 |
| 6,404,075 B1 | * | 6/2002 | Potter et al. | 307/64 |
| 6,428,918 B1 | * | 8/2002 | Fuglevand et al. | 429/13 |

* cited by examiner

Primary Examiner—Gregory J. Toatley, Jr.
Assistant Examiner—Sharon A. Polk
(74) Attorney, Agent, or Firm—Heslin Rothenberg Farley & Mesiti P.C.; John Pietrangelo

(57) ABSTRACT

Methods and systems for providing a portable source of electrical power are disclosed. These methods and systems include portable power supplies and power synchronizing devices. These methods and systems can be used to provide power to residential and commercial buildings, as well as to, for example, emergency equipment, on a temporary basis. The disclosed portable power supply may include fuel cells or batteries as the source of electrical power. When a fuel cell is used, the portable power supply system typically includes a source of hydrocarbon fuel or hydrogen fuel. The portable power supply is preferably mounted upon a moveable platform, such as a truck or trailer, so that it can be transported to the site where needed. The invention is particularly applicable to providing temporary power when fuel-cell type power supply systems, for example, those including PEM-type fuel cell stacks, require servicing. The invention provides temporary power to such fuel-cell systems wherein the power supply to the load is not interrupted.

21 Claims, 1 Drawing Sheet

PORTABLE POWER SUPPLY SYSTEM AND A METHOD FOR PROVIDING ELECTRICAL POWER

TECHNICAL FIELD

This invention relates generally to methods and systems for providing electrical power, in particular, methods and systems for providing temporary or supplemental electrical power to supplement or replace an existing power supply.

BACKGROUND OF THE INVENTION

The electrical demands of residential and commercial buildings have been traditionally powered via connection to a utility grid of power lines transporting electricity from a central generation facility. Increasingly, utility grids are being supplemented or even replaced by distributed generation systems, which can provide power in closer proximity and relation to specific power demands. For example, an on-site fuel cell system can be used to power a residential or commercial building or other application, eliminating the need for connection to a utility grid. Distributed generation systems can also be used in conjunction with the utility grid, to accommodate peak electrical demands, as an example.

Fuel cell systems and other distributed power generation systems, as well the utility grid itself, may require periodic maintenance. In many residential and commercial applications for electricity, it may be desirable to switch off an existing power supply for maintenance, while switching on a secondary power supply in such a way that appliances can maintain uninterrupted operation.

SUMMARY OF THE INVENTION

The present invention generally includes methods and systems for providing a source of electrical power, for example, on a temporary basis. This source of power can be provided to a load, for example, to a building or appliance, otherwise powered by an existing power supply during servicing or power outages. The present invention may also be used as stand-alone source of power, for example, at a construction site, at the site of a medical emergency, or to a remote location. The temporary or supplemental power source according to the present invention is portable so that it can be easily transported to the location where needed. When supplementing or replacing the electrical power of an existing power supply system, the power supply of the present invention is quickly and easily interfaced with the existing power supply system. Though these systems and methods can typically be used temporarily or for a limited amount of time, it will understood by those of skill the art that under certain conditions, these systems and methods may also be used for extended periods of time, for example, for days, weeks, months, or even years.

One embodiment of the present invention is a method of supplying power to a load having an existing power supply, in which the method includes or comprises: providing a portable power supply having a power synchronizing device; activating the power synchronizing device to synchronize the power from the existing power supply and the portable power supply; and providing power from the portable power supply to the load.

A further embodiment of the present invention is a method for servicing an existing power supply system, including or comprising: providing a portable power supply and a power synchronizing device; connecting the existing power supply system and the portable power supply to the power synchronizing device; activating the power synchronizing device to synchronize the power from the existing power supply system and the portable power supply; providing power from the portable power supply to the load; shutting down the existing power supply; and servicing the existing power supply system while the load is powered by the portable power supply.

A still further embodiment of the present invention is a system for providing power to a load powered by an existing fuel-cell-type power supply, said system comprising: a portable fuel-cell-type power supply; and a power synchronizing device having at least a first power input connectable to the portable power supply and a second power input connectable to the existing power supply, and a power output connectable to the load. The portable fuel-cell-type power supply system and the existing fuel-cell-type power supply convert at least one of a hydrocarbon fuel and hydrogen to electric power. The hydrocarbon fuel is selected from the group of fuels consisting of methane, propane, methanol, ethanol, and natural gas.

In one example, when the portable power supply according to the present invention is used to replace or supplement an existing power supply, the existing power supply and the portable power supply are preferably both fuel-cell type power supplies. In particular, the power supplies preferably both include one or more PEM-type fuel cells, or one or more PEM-type fuel cell stacks.

Other features, objects, and advantages of the invention will be apparent from the drawings, description, and claims.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be understood from the following detailed description of preferred embodiments taken in conjunction with the accompanying drawings in which:

DETAILED DESCRIPTION OF THE INVENTION

Figure 1:
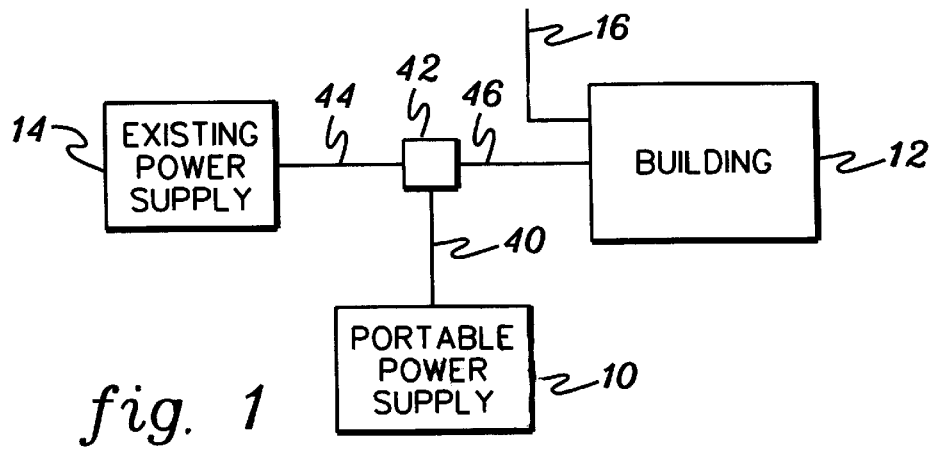
FIG. 1 is a schematic diagram of a portable power supply connected to an existing power supply for powering a load in accordance with one embodiment of the present invention.

FIG. 1 illustrates one embodiment of a portable power supply 10 for providing a source of electrical power to a residence or commercial building 12. In the embodiment shown in FIG. 1, building 12 includes an existing power supply system 14. The existing power supply system 14 may be a fuel-cell type power supply system, for example, containing one or more PEM-type fuel cells. Building 12 may also be connected to an existing power supply system such as a local electrical utility power grid 16. It is to be understood that the existing power supply 14 or grid 16 typically requires periodic servicing or maintenance. The present invention addresses the problem that during servicing or maintenance building 12 typically still requires a continuous, uninterrupted source of electrical power. The portable power supply is used to provide a source of electrical power, for example, on a temporary basis, to building 12 in such a manner that building 12 has a continuous, uninterrupted power source while existing power supply 14 or grid 16 is being serviced. It is understood by those in the art, that the residence or commercial building 12 may not only be a building but may be any load that requires electrical power, for example, electric lighting, emergency equipment, or emergency medical equipment, and the like.

Power supply 10 may be mounted on a movable skid, platform, or a trailer having wheels and an appropriate hitch (not shown) so that it can be transported to the site where needed, for example, transported to building 12. Power supply 10 may also be mounted in a car, van, truck or other vehicle. Power supply 10 may include any form of power source, for example, one or more batteries, a gas or diesel powered generator, but preferably includes a fuel-cell-type power supply as illustrated in FIG. 2.

Figure 2:
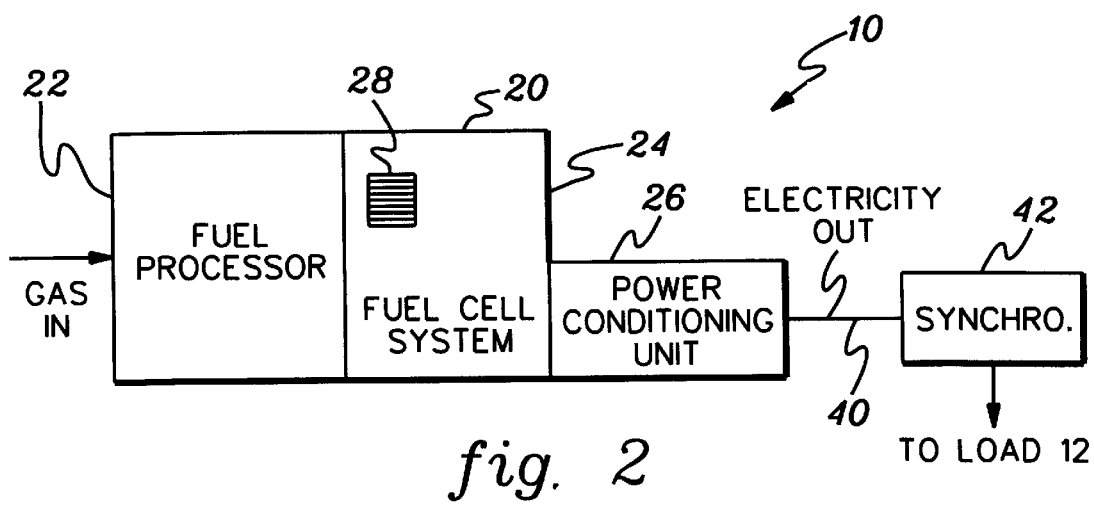
FIG. 2 is an enlarged schematic diagram of a PEM fuel cell system that can be used for the portable power supply shown in FIG. 1 in accordance with the present invention.

Power supply 10, best illustrated in FIG. 2, is a PEM-type fuel cell for converting a hydrocarbon or hydrogen fuel to electricity. In the system shown in FIG. 2, power supply 10 includes a PEM-type fuel cell system 20. PEM fuel cell system 20 typically includes a fuel processor 22, a fuel cell subsystem 24, including a fuel cell stack (not shown), and a power conditioning unit 26 to convert the direct current produced by the fuel cell into alternating current similar to that available from a utility grid.

As an example of a fuel cell subsystem 24, the fuel cell stack may include a cathode flow field plate, an anode flow field plate, a membrane electrode assembly disposed between the cathode flow field plate and the anode flow field plate, and two gas diffusion layers disposed between the cathode flow field plate and the anode flow field plate. To accommodate the heat generated by the reaction is the cell, the fuel cell can also include one or more coolant flow field plates disposed adjacent the exterior of the anode flow field plate and/or the exterior of the cathode flow field plate. Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a polymer electrolyte membrane) between a first catalyst and a second catalyst. One gas diffusion layer is disposed between the first catalyst and the anode flow field plate, and the other gas diffusion layer is disposed between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst. The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate. Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented as the following:

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown above, the hydrogen forms protons (H$^+$) and electrons. The protons flow through the electrolyte to the cathode side of the membrane electrode assembly, and the electron flow from the anode side of the membrane electrode assembly to the cathode side of the membrane electrode assembly through the external load. The electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating. Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

The electric potential provided by a fuel cell is theoretically set by the electrochemical potential of the reaction conducted in the cell, but may be somewhat less depending on factors such as the reaction conditions, physical properties of the membrane, and the conductivity of the cell. For example, a typical PEM fuel cell may provide a potential in a range from about 0.5 to 1 volts. The amount of current produced depends on the amount of fuel reacted. To achieve a system with higher voltage, a plurality of fuel cells can be arranged in series to form what is referred to as a fuel cell stack.

In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Referring to FIG. 2, the fuel processor 22 (also referred to as a "reformer") converts a hydrocarbon feed stream such as natural gas or propane into a hydrogen-rich stream (referred to as "reformate"). The reformate is reacted in the fuel cell stack in fuel cell subsystem 24 with air supplied from intake duct 28, and the resulting electricity is processed by power conditioning unit 26. A pure reactant fuel cell may also be used for portable power supply 10, for example, using bottled hydrogen and oxygen.

As an example of a reformer system, a hydrocarbon such as methane may be reacted as known in the art according to the following reactions (e.g., at a temperature of about 1,000 degrees C. in the presence of a platinum catalyst):

$$\tfrac{1}{2}O_2 + CH_4 \rightarrow 2H_2 + CO \qquad (4)$$

$$H_2O + CH_4 \rightarrow 3H_2 + CO \qquad (5)$$

Carbon monoxide produced as a byproduct from these reactions may then be reduced (to avoid poisoning CO sensitive catalysts in the fuel cells) by further reacting the gas mixture as known in the art according to the following reactions (e.g., at a temperature of about 200 degrees C. in the presence of a platinum catalyst):

$$CO + H_2O \rightarrow H_2 + CO_2 \qquad (6)$$

$$CO + \tfrac{1}{2}O_2 \rightarrow CO_2 \qquad (7)$$

Power conditioning unit 26 (such as those commercially available from Advance Energy, Inc. Wilton, N.H.) converts the low voltage direct current (DC) produced by the PEM fuel cell to a high voltage alternating current (AC) for use by building 12. Batteries may additionally be used to ensure that power surges from such things as air conditioner start-ups can be handled. Batteries also may meet any extended peak period of demand, which are higher than stack peak output. Alternatively, power conditioner 26 may produce DC current for use by loads requiring such current.

When power supply system 10 is used to provide power to building 12 having existing power supply 14, the power from cable 40 is preferably connected to a synchronizing device 42 (also referred to as a power synchronizer, or simply synchronizer) to ensure that the power supplies are in phase prior to directing power to building 12 from the power supply desired. Again, as described above, building 12 may be any load requiring electrical power. In this way, the power supplies can be substituted without interrupting the operation of appliances being powered that would otherwise be sensitive to a short power outage or change of power phase.

In the arrangement shown in FIG. 1, existing power supply 14 is connected to building 12 in parallel to grid 16. As an example, the building 12 may be split between existing power supply 14 and grid 16. Building 12 can also be powered by being switched to power supply 14 from grid 16 during peak demand periods when grid 16 is unable to supply sufficient power (and vice versa). The circuitry used to control the switching of power supplies in such arrangements can be referred to as a grid-parallel controller. The grid-parallel controller (not shown) may be included in the synchronizing device 42 or power conditioner 26 or be a stand-alone unit. In still other embodiments, existing power supply 14 can be grid 16 by itself, and portable power supply 10 can be used as a substitute for grid 16 during grid power outages.

Referring to FIG. 1, existing power supply 14 is also connected to synchronizing device 42 via a cable 44. Power from existing power supply 14 passes through synchronizing device 42 and is directed to building 12 via a cable 46. When power supply system 10 is provided for building 12 having existing power supply 14, the power from cable 40 (more accurately, a wiring harness) is synchronized and in phase with the power supplied from cable 44 (again, typically a wiring harness). Cable 40 is typically connected to an inverter (for example, inverter 48 of FIG. 3) of portable power supply 10. During the transfer of the flow of power from existing power supply 14 to portable power supply 10, the two power supplies communicate via cables 40 and 44. Power conditioner 26 of portable power supply 10 (see FIG. 2) may be configured for grid-parallel operation, in which the control card and logic for the power conditioner in power supply 10 will synchronize to match the voltage and phase of existing power supply 14. Alternatively, synchronizing device 42 will synchronize to match the voltage and phase of existing power supply 14 with portable power supply 10. An attending technician may be notified that the inverters have been synchronized, at which point the attending technician can drop the load from existing power supply 14. This process can also be automated. An automatic bus transfer switch (e.g., rated between 100–200 amperes depending upon application) will cycle to the portable power supply system 10.

In one embodiment of the invention, the power inverting and power synchronizing functions can be performed by the same device, for example, the power conditioning unit 26 of portable power supply 10 shown in FIG. 2 may include both a power inverting device and a power synchronizing device. This dual inverting and synchronizing function may also be located in the existing power supply 14.

When it is deemed that portable power supply 10 is no longer necessary, existing power supply system 14 is started and a parasitic load is applied. Portable power supply system 10 will then synchronize itself and the load to match existing power supply system 14. The attending technician or automated control system would then be notified that the two systems are synchronized, and would then drop the load from portable power supply 10, which would cause the automatic bus transfer switch to cycle to the existing power supply.

In the context of this invention, a synchronizing device refers to circuitry that matches the phase of one power source to the phase of another power source. Approaches to synchronizing power sources are well-known in the art. As an example, a voltage of an existing AC power supply can be used as an indication of the phase of the power being provided to a load. A portable AC power supply can be activated, and the synchronizing device circuitry can delay switching the load to the portable power supply until the phase is essentially the same between the two power supplies. Other approaches include timing when the portable power supply is activated in order to produce a power output with the appropriate phase, and using the synchronizing device to cause a power conditioning circuit on the portable power supply to manipulate the output waveform (e.g., digitally or by frequency modulation) to match the existing power supply.

Building 12 also may have a panel (not shown), which may further include an automatic bus transfer switch between existing power supply 14 (e.g., grid 16 or fuel cell system 20, or both, configured in parallel as shown in FIG. 1) and an alternative power supply such as the portable power supply 10. In some embodiments, the panel has at least two connectors, one for existing power supply 14 (which may also be permanently wired to the panel) and one for portable power supply 10. In this way, portable power supply 10 can simply be connected to the panel and activated to allow synchronizing device 42 to effect substitution of the power supplies. In other embodiments, existing power supply 14 may include an input connector for portable power supply 10 so that portable power supply 10 can be connected to building 12 via the connections of existing power supply 14. The bus transfer switch may thus be employed as part of the existing power supply circuitry or be associated with the existing power supply, as opposed to being associated with a power distribution panel of building 12. It will be appreciated by those in the art that when existing power supply 14 is disconnected from building 12 for servicing, existing power supply 14 may need to be electrically isolated (by a bus transfer switch, as an example) to protect the safety of the service technician. Existing power supply 14 or grid 16 can thus be shut down and serviced as required without interrupting the flow of power to building 12.

Upon completion of the servicing of existing power supply system 14, for example, after periodic maintenance or repair, existing power supply system 14 can be powered up and synchronizing device 42 can again be activated. When the power supplies are again synchronized, the synchronizing device 42 will automatically direct power (or allow power to be directed) from existing power supply system 14 to building 12. Portable power supply 10 can then be shut down and removed from the site.

Figure 3:
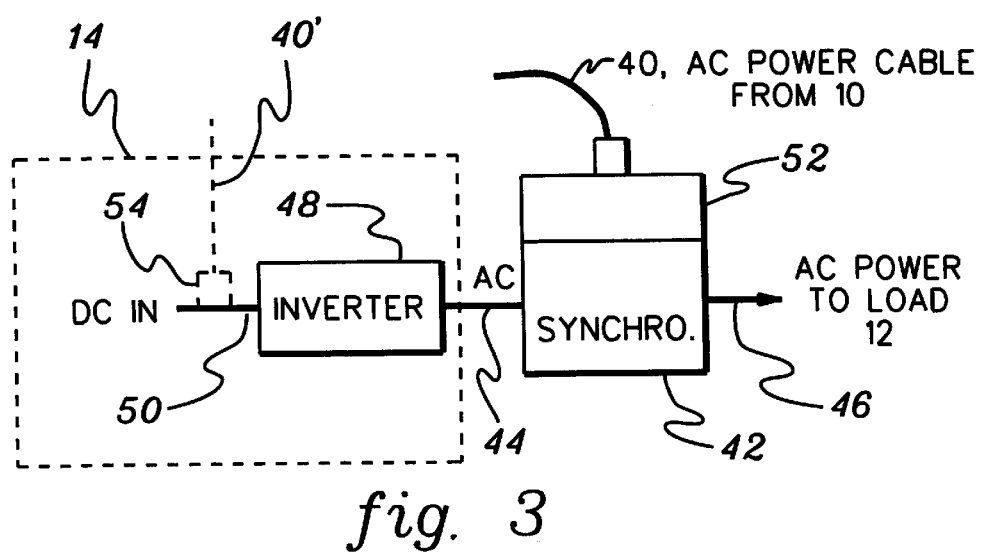
FIG. 3 is an enlarged schematic detail diagram of the electrical interfaces for a portable power supply for another embodiment for the system shown in FIG. 1.

FIG. 3 illustrates an alternate embodiment of the interfaces between the power cables from portable power supply system 10 and existing power supply system 14 with synchronizing device 42 shown in FIG. 1. The boundary of existing power supply system 14 is identified by a dotted line in FIG. 3. Existing power supply system 14 typically includes a DC-to-AC power inverter 48 which receives DC power via a cable 50 and outputs AC power to cable 44. The power from portable power supply system 10 provided by cable 40 is preferably introduced to synchronizing device 42 by means of an automatic bus-transfer switch 52.

Other sources of power may also be used for the power supply in the portable power supply system 10, for example, a DC power supply, specifically, one or more batteries. That is, power supply 20 in FIG. 1 may also be one or more batteries, for example, one or more dry or wet cell batteries. When the portable power supply 10 is a DC power supply, the cable 40' from DC power supply 10 typically interfaces with existing power supply system 14 at a point upstream of DC-to-AC inverter 48. For example, DC power cable 40' in FIG. 3 connects to a cable 50 leading to inverter 48 by means of a disconnect switch 54.

Although various embodiments have been illustrated and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for servicing an existing power supply, comprising:

providing a portable power supply and a power synchronizing device;

connecting the existing power supply and the portable power supply to the power synchronizing device;

powering a load with the portable power supply;

shutting down the existing power supply; and servicing the existing power supply.

2. The method as in claim 1 further comprising:

powering up the existing power supply;

providing power from the existing power supply to the power synchronizing device;

powering the load with the existing power supply; and shutting down the portable power supply.

3. The method as in claim 2, further comprising activating the power synchronizing device to synchronize the power from the existing power supply and the portable power supply.

4. The method of claim 1, wherein at least one of the existing power supply and portable power supply includes a DC-to-AC power inverting device and the power synchronizing device.

5. The method of claim 1, further comprising synchronizing the power from the existing power supply and the portable power supply.

6. The method of claim 1, wherein at least one of the existing power supply and the portable power supply includes a fuel cell, the method further comprising introducing one of a hydrocarbon fuel and hydrogen to the fuel cell.

7. The method of claim 6 wherein introducing a hydrocarbon fuel comprises introducing a hydrocarbon fuel selected from the group of fuels consisting of methane, propane, methanol, ethanol, and natural gas.

8. The method of claim 7, wherein the fuel cell comprises a PEM-type fuel cell, and wherein the method further comprises introducing one of a hydrocarbon fuel and hydrogen to the PEM-type fuel cell.

9. The method of claim 1, wherein the existing power supply comprises a fuel cell system including a portable power supply input connector, and wherein the method further comprises connecting the portable power supply to the portable power supply input connector and isolating the existing power supply from the load.

10. The method of claim 1 wherein the existing power supply includes a grid-parallel controller adapted to selectively supply power, the method further comprising selectively supplying power to the load from a utility grid and a fuel cell system using the grid-parallel controller.

11. The method of claim 1, wherein the method further comprises providing an automatic bus-transfer switch and transferring power from the portable power supply to the power synchronizing device using the automatic bus-transfer switch.

12. The method of claim 1, wherein the power synchronizing device comprises a first power input, a second power input, and a power output, wherein the method further comprises:

connecting the portable power supply to the first power input;

connecting the existing power supply to the second power input; and connecting the power output to the load.

13. A method for supplying power to a load powered by an existing power supply, comprising:

providing a portable power supply;

synchronizing the portable power supply and the existing power supply;

powering the load with the portable power supply;

shutting down the existing power supply; and servicing the existing power supply.

14. The method of claim 13, further comprising transporting the portable power supply to the load.

15. The method of claim 13 further comprising, after servicing the existing power supply:

synchronizing the existing power supply and the portable power supply;

powering the load with the existing power supply; and shutting down the portable power supply.

16. The method of claim 13, wherein at least one of the existing power supply and portable power supply includes a fuel cell, the method further comprising introducing one of a hydrocarbon fuel and hydrogen to the fuel cell.

17. The method of claim 16 wherein introducing a hydrocarbon fuel comprises introducing a hydrocarbon fuel selected from the group of fuels consisting of methane, propane, methanol, ethanol, and natural gas.

18. The method of claim 16, wherein the fuel cell comprises a PEM-type fuel cell, and wherein the method further comprises introducing one of a hydrocarbon fuel and hydrogen to the PEM-type fuel cell.

19. The method of claim 13 wherein the existing power supply comprises a fuel cell system including a portable power supply input connector, and wherein the method further comprises connecting the portable power supply to the portable power supply input connector and isolating the existing power supply from the load.

20. The method of claim 13 wherein the existing power supply includes a grid-parallel controller adapted to selectively supply power, the method further comprising selectively supplying power to the load from a utility grid and a fuel cell system using the grid-parallel controller.

21. The method of claim 13, wherein the method further comprises providing an automatic bus-transfer switch and transferring power from the portable power supply to the power synchronizing device using the automatic bus-transfer switch.

* * * * *